United States Patent [19]
Clark, II

[11] Patent Number: 5,558,140
[45] Date of Patent: Sep. 24, 1996

[54] DEVICE FOR DRAINING FLUID FROM A CONTAINER

[75] Inventor: James E. Clark, II, Ojai, Calif.

[73] Assignee: Clark Technology Systems, Inc., Santa Paula, Calif.

[21] Appl. No.: 300,402

[22] Filed: Sep. 2, 1994

[51] Int. Cl.[6] .................................. B65B 1/04; B65B 3/04
[52] U.S. Cl. ........................ 141/98; 141/329; 141/330; 141/346; 141/383; 184/1.5
[58] Field of Search ............................ 141/65, 98, 329, 141/330, 346, 383; 184/1.5

[56] References Cited

U.S. PATENT DOCUMENTS

| | | | |
|---|---|---|---|
| 3,817,302 | 6/1974 | Kowal et al. | 141/383 |
| 4,071,012 | 1/1978 | Cooke | 141/98 |
| 4,177,529 | 12/1979 | Sikula, Jr. | 141/330 |
| 4,676,281 | 6/1987 | Nord | 141/65 |

Primary Examiner—Henry J. Recla
Assistant Examiner—Timothy L. Maust
Attorney, Agent, or Firm—I. Morley Drucker; Howard N. Sommers; Daniel R. Kimbell

[57] ABSTRACT

A fluid container draining device for draining fluid from a fluid container, an oil filter, in a controlled manner. The fluid container draining device has a threaded screw with a sharpened tip and a channel communicating between an opening at a forward end of the screw and a rear region of the threaded screw. When the screw is turned it will penetrate the wall of the fluid container and enter the fluid containing cavity of the fluid container. The threaded screw has a radially extending abutment surface to provide fluid tight sealing between the screw and the fluid container's walls to prevent fluid leakage. A fluid valve is positioned at the rear region of the screw to provide fluid flow control between the interior of the fluid container and outside the fluid container. The fluid valve is provided with a fitting for connection to a suction line to thereby permit fluid to be evacuated from the fluid container.

12 Claims, 4 Drawing Sheets

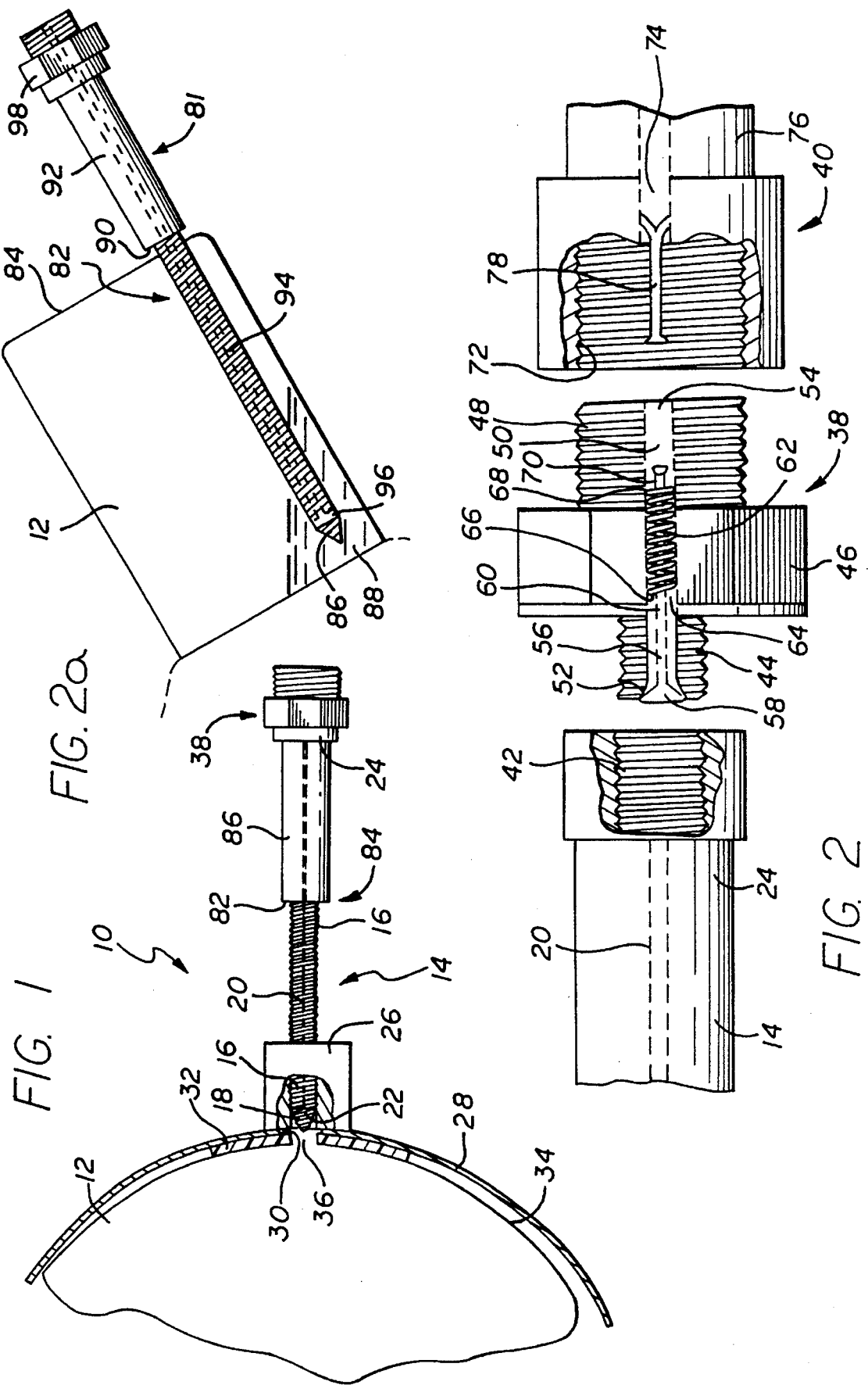

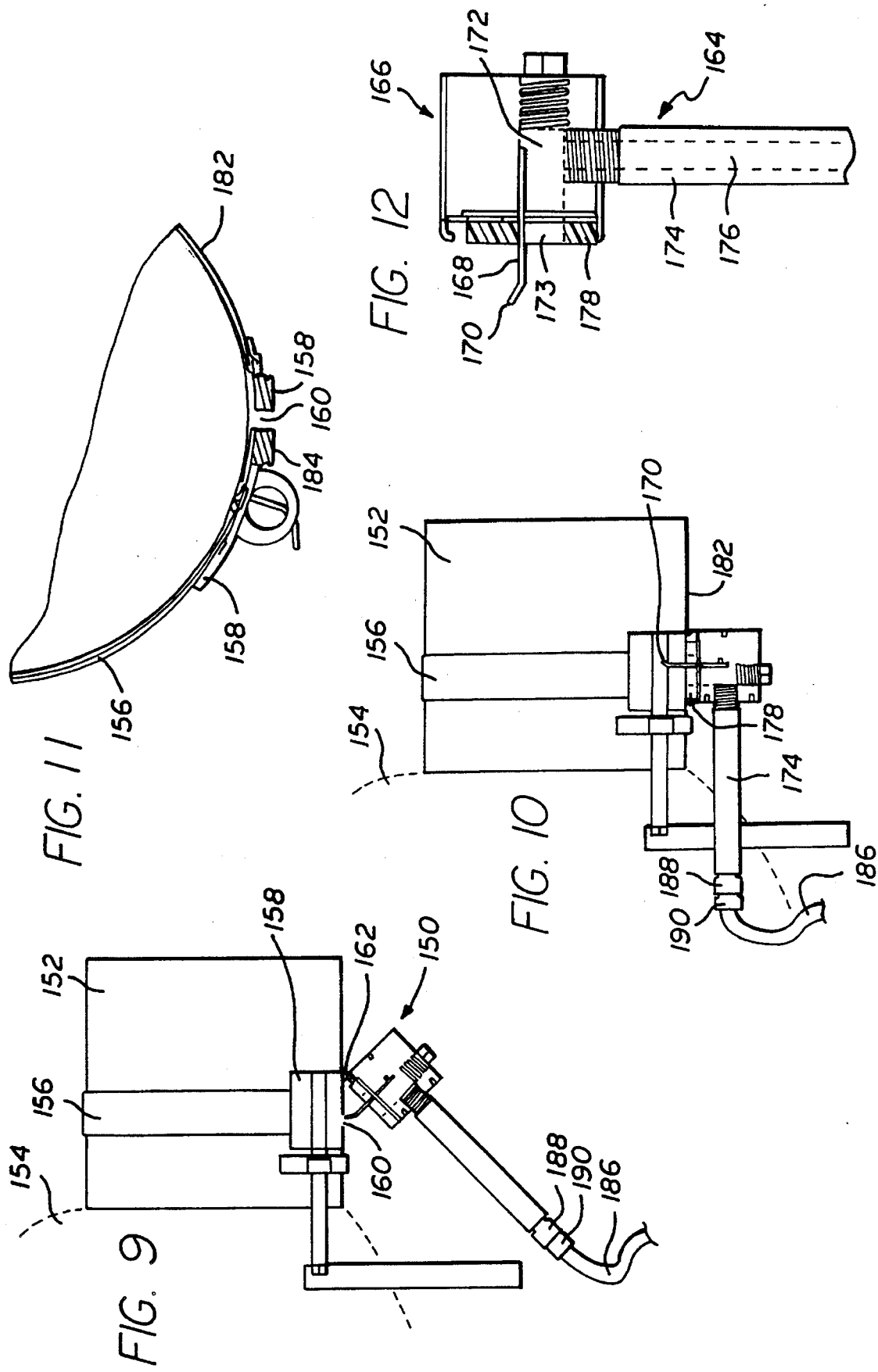

DEVICE FOR DRAINING FLUID FROM A CONTAINER

BACKGROUND OF THE INVENTION

1. Field of the Invention

This invention relates to an apparatus for drawing fluid from a container and more particularly to a system and device for evacuating fluid from a fluid, i.e. oil, from a filter before the filter is removed from the motor or machinery, to avoid leakage of the fluid from the filter.

2. Description of the Prior Art

Lubrication systems in machinery, aircraft and vehicles include oil filters, which must be replaced periodically to maintain the good working order of the engine and machinery.

For passenger automobiles, many mechanics recommend a oil and filter change every 3,000 miles of travel to maintain maximum engine life. Professional truckers put hundreds of thousands of miles on their trucks every year and spend many, many hours getting oil changes.

Replacing the oil in a motor vehicle typically involves placing a large oil drain basin under the oil pan, removing the drain plug, thereby allowing the oil to drain therein, and unscrewing the oil filter from the engine block. Due to the engine designs of most engines, it has been difficult to remove oil filters without spilling oil onto the frame of the vehicle, on the mechanics and/or the ground. Since many oil changes are conducted when the oil is very hot, this also poses a safety issue to mechanics.

Attempts have been made to overcome these problems of oil changes. U.S. Pat. No. 4,177,529 to Sikula, Jr. discloses an oil filter draining wrench which has a cylindrical housing with a center punch for punching and draining oil from an oil filter. The filter wrench is hammered onto the filter. A rubber gasket at the open end of the cylindrical housing sealingly engages the outside of the oil filter, and prevents oil from leaking out around the punch. An oil drain outlet is used to drain the oil from the housing which collects it. In the tight engine compartments of modern motor vehicles, there is rarely enough space to place such a housing over the oil filter much less to swing a hammer.

U.S. Pat. Nos. 4,776,431 and 4,865,156 to Poling disclose oil change devices and methods which utilize punches and vacuum chambers. The vacuum chambers are attached by suction to the oil filter, and the punches are driven into the filter's sidewalls, penetrating the filter. The oil will thus be evacuated out of the filter, through the vacuum chamber, and out the evacuation tube. The Poling devices unduly rely on the vacuum seal thus established, and these devices would not be expected to operate reliably.

U.S. Pat. No. 5,299,714 to Kilgore discloses what is said to be a self-sealing oil filter punch, which is driven into the metal housing of an oil filter, so the oil can be drained through the hollow center of the punch and out the oil filter. The sharp tip of the punch is pushed through the bottom of the oil filter, and the punch has a resilient washer for sealing the punch against the oil filter's housing. A spigot valve is located on the end of the Kilgore device to control the oil flow through the punch. The Kilgore oil filter punch lacks means to positively engage the oil filter punch in fluid tight contact with the oil filter's housing, and jarring of the punch would be expected to unseat the seal. Moreover, if the spigot valve handle is advertently turned at an inopportune time, oil will spill out of the filter.

U.S. Pat. No. 1,248,251 to Breaux discloses a faucet which is bored into a barrel to gain access to its contents. The faucet has an auger at its tip, for drilling into the barrel, which transitions into a smooth, widening tapered shaft which is driven into the barrel to provide frictional sealing engagement with walls of the barrel. While the Breaux device may be acceptable for wood barrels, it would not be expected to function in the case of metal container, such as thin, metal walled oil filters.

There accordingly remains a need for a filter draining fitting which is easy to use, simple in design, and provides leak proof operation.

BRIEF SUMMARY OF THE INVENTION

The invention provides a fluid container draining device which allows fluid to be removed from a fluid container in a controlled manner, said fluid container having walls defining a fluid filled interior region therebetween, said fluid container draining device comprising:

a threaded screw means with a sharpened tip, which screw means when turned will penetrate the wall of the fluid container and enter the fluid containing cavity of the fluid container, said screw means having an internal channel communicating between an opening at a forward end of the screw means and a rear region of the threaded screw means;

a means to provide fluid tight sealing between the screw means and the fluid container wall to prevent fluid leakage; and a fluid valve means positioned at the rear region of the screw means in fluid connection with the channel, said valve means providing fluid flow control between the interior of the fluid container and the outside of the fluid container.

The invention further provides a fluid draining device which allows fluid to be removed from a fluid container in a controlled manner, said fluid container having walls defining a fluid filled interior region therebetween, said fluid container draining device comprising:

a threaded screw means with a sharpened tip, which screw means is screwed in to penetrate the wall of the fluid container and form a hole therein;

a housing means which sealingly contacts the walls of the fluid container, said housing means having a threaded channel sized to fit the screw means, and a fluid channel which at a first end intersects the threaded channel, and which has a second open end, wherein by turning the threaded screw means, the first end of the channel can be closed and opened; and a fluid valve means positioned at the open end of the fluid channel, said valve means providing fluid flow control between the interior of the fluid container and outside the fluid container.

The invention further provides an oil filter draining device which allows fluid to be removed from an oil filter in a controlled manner while the oil filter is still positioned on a vehicle or machine, said oil filter having walls defining an oil filter interior region therebetween, said oil filter draining device comprising:

a bracket means held in the fluid tight contact against the wall of the oil filter by strap means, said bracket having a clasp;

a puncturing lever with a head portion and a handle portion, said head portion having a front face, a hook means at a top region for hooking onto the clasp of the bracket means, a oil filter wall puncturing bar with a sharpened tip which is positioned below the hook means and above the handle portion, said punching bar being located in the vicinity of a fluid channel which is open at the front face of the head portion, said fluid channel being in communication with a fluid channel formed in the handle portion, said head portion having a sealing means positioned around the vicinity of the open end of the fluid channel; and a fluid valve means positioned on the fluid channel of the handle portion, said valve means providing fluid flow control between the interior of the oil filter and outside the oil filter, said valve means being provided with a fitting for connection to a vacuum source to thereby permit fluid to be evacuated from the oil filter.

BRIEF DESCRIPTION OF THE DRAWINGS

FIG. 1 is a partially exposed top view of a first embodiment of the device for draining fluid from a container.

FIG. 2 is a partially exposed, exploded view of the device, its valve portion, and valve opening coupler.

FIG. 2a is a partially exposed side view of a second embodiment of the device, engaged with an oil filter.

FIG. 9 is a partially exposed side view of a fourth embodiment of the device for draining fluid from a container, viz., an oil filter mounted on an engine, with its puncturing lever in its pre-operational position.

FIG. 10 is a partially exposed side view of the device of FIG. 9, with the puncturing lever in its operational position.

FIG. 11 is a partial exposed end view of an oil filter with the filter wrench secured therearound.

FIG. 12 is a partially exposed side view of the puncturing lever of embodiment of FIG. 9.

DETAILED DESCRIPTION OF THE DRAWINGS

Figure 3:
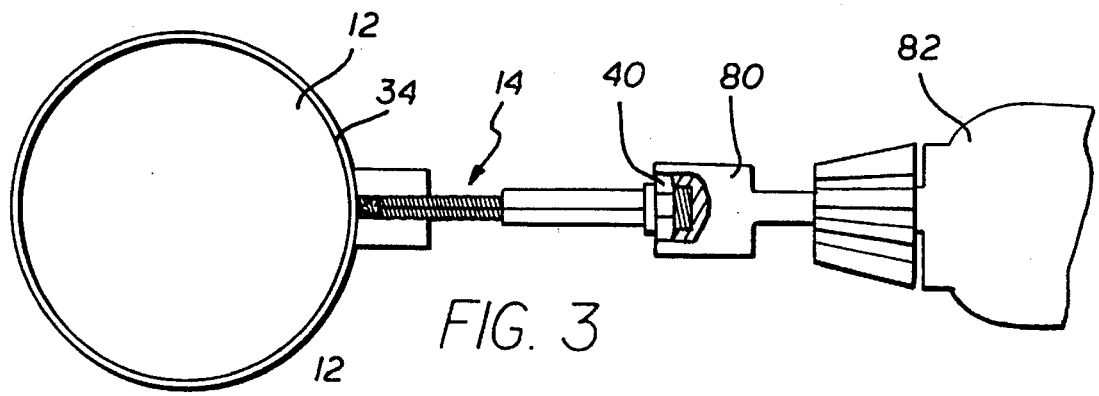
FIG. 3 is a partially exposed top view of the device of the first embodiment engaged with a socket driver of a drill, prior to its fluid evacuating screw being screwed into the wall of the container.

Referring first to FIG. 1, a first embodiment of the device 10 for drawing fluid from a container 12 is shown. In this figure, as well as the other figures described below, the container 12 is an oil filter, such as used on motors and machinery. The devices of the invention can be used to drain any number of containers, such as drums, cans, filters or pipes, of any number of fluids, e.g. lubricants, coolants, inks, and other chemicals.

The device 10 includes a shaft 14 which is male threaded at least a front region 16. It has a sharpened tip 18 at its forward end.

A central, internal, fluid channel 20, having an elongated bore, communicates at a front end with one or more openings 22 just behind the sharp puncturing tip 18, and with a rear end 24 of the shaft 14. The threaded portion of the shaft 14 is threaded into a female threaded screw guide or housing means 26, which is fixably positioned on a clamp means 28 clamped to the container 12. The clamp means 28 can conveniently comprise a metal, plastic, or fabric strap which can be tightened around the container 12. An opening 30 is formed in the clamp means 28 for passage of the sharp puncturing tip 14. Adjacent sealing material 32 is optionally located on the inner surface of the clamp means 28, just behind the screw guide housing means 26. This sealing material 32 is formed of resilient rubber, plastic, or fibrous material and assists in forming a leak proof seal in the event the threaded shaft 16 fails to achieve a liquid tight seal with the wall 34 of the container 12.

An opening 36 is likewise formed in the sealing material 32 for passage of the tip 18 and threaded front region 16 of the shaft 14. A valve means 38 is attached to the rear end of the shaft 24.

Turning of FIG. 2, a partially exploded and exposed view of the rear end 24 of the shaft 14, the valve means 38, and a valve activating coupler 40 are shown. The rear end of the shaft 24 has a female threaded opening 42, into which the fluid channel 20 opens. The valve means 38 has a front male threaded end 44, a turning portion 46, shown herein as a hex nut surface, and a rear male threaded end 48. The front male threaded end 44 is sized to thread into the female threaded end of the shaft 14. A valve channel 50 radially passes through the valve means 38, and opens at a forward end on the front male threaded end 44, with an outwardly beveled surface 52. The rear end 54 of the valve channel 50 opens at the rear male threaded end 48 of the valve means 38. A plunger piston 56 with a beveled seating head 58 and a shaft 60 is positioned in the valve channel 50. A coil spring 62 is located inside the valve channel 50. It rests at a front end 64 on a lip 66 in the channel 50. A spring stop 68 is affixed near the rear end 70 of the plunger piston's shaft 60. This can comprise a nut on a threaded end of the plunger, a "C" or "E" ring, or other known means. The coil spring 62 will be compressed between the lip 66 and the spring stop 68, and pull the beveled seating head 58 in fluid tight seating engagement with the outwardly beveled surface 52 of the valve channel 50. In this position, fluid will not traverse the valve means 38. The valve activating coupler 40 has a female threaded end 72, and is sized to matingly thread with the rear male threaded end 48. A coupler channel 74 radially passes through the valve activating coupler 40 and fluid tightly communicates with a vacuum line 76. A plunger activating pushrod 78 is located in the female threaded end 72, and when the coupler 40 is screwed onto the rear male threaded end 48, it will push the plunger 56 so that its beveled sealing head mover out of contact with the complementing beveled front end of the valve channel 50, and the valve channel will be opened. Removing the coupler 40 will return the plunger 52 to its closed position. Such a valve 38 is available from Femco, of Amersterdam, Holland. In addition to the above described oil valve, pneumatic connectors, such as are used on air hoses, can also be utilized (not shown).

Figure 4:
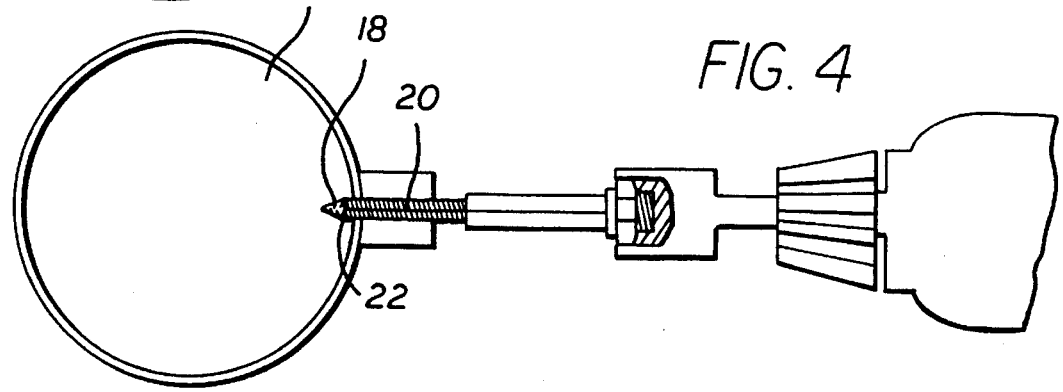
FIG. 4 is a partially exposed top view of the embodiment of FIG. 2, with its fluid evacuating screw screwed into the wall of the container.
Figure 5:
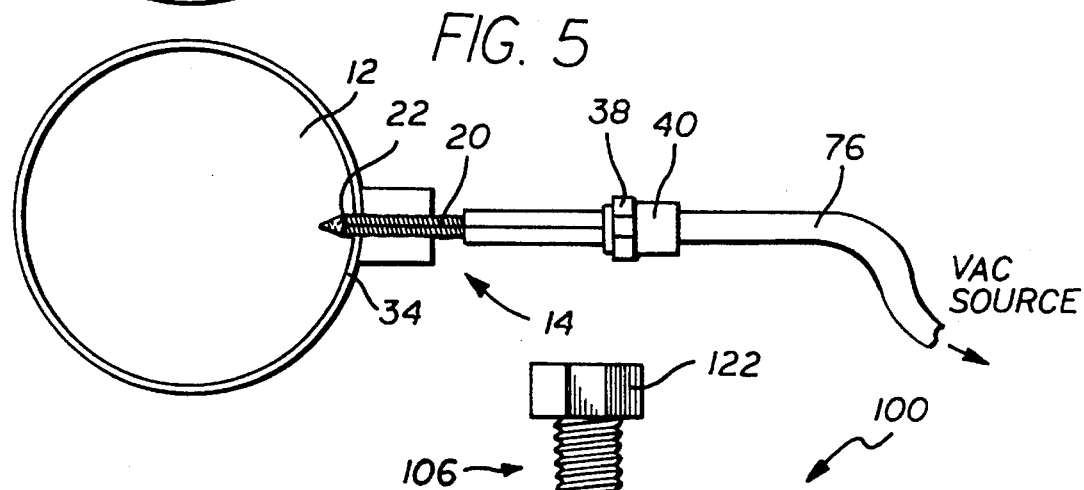
FIG. 5 is a partially exposed top view of the embodiment of FIG. 2, with the socket of a drill removed, and with its oil valve connected to a valve coupler and fluid transfer line, to evacuate fluid from the container.

FIG. 3 shows the first embodiment of the device 10 engaged on a container 12—here an oil filter. The torquing portion 46 of the shaft 14 of the device is engaged with a socket driver 80 of a drill 82. FIG. 4 shows the shaft 14 drilled through the wall 34 of the container 12 such that its tip 18 and the openings 22 in the fluid channel 20 behind to tip 18 lie interiorly of the container's wall 34, and in contact with the fluid contained therein. FIG. 5 shows the device 10 with the socket driver removed, and with the valve actuating coupler 40 engaged with the valve 38. The vacuum line 76 is connected to the valve actuating coupler 40, and a vacuum is applied to thereby evacuate fluid from the container 12, through the opening 22 and fluid channel 20, the open valve 38, the valve actuating coupler 40, and out the vacuum line 76. As described above, the sharpened tip 18 of the shaft 14 pierces the wall 34 of the container 12. The threaded shaft 16 will screw into the wall 34 and create a seal with the wall 34. However, for added leak prevention the sealing material 32 will help form a fluid tight seal.

After the fluid is completely withdrawn from the container 12, the coupler 40 with its vacuum line 76 are removed from the fluid valve 38, and the shaft 14 is optionally removed from the screw guide means 26, and the screw guide means 26 and its attached clamp means 28 are used to unscrew the oil filter 12 from the engine or machine to which it is attached.

FIG. 2a depicts a second embodiment 81, which is particular useful in the case of oil changes for propeller driven aircraft, where the oil filter 12 is located in a relatively inaccessible location, and removing the oil from the oil filter 12 prior to unscrewing the oil filter 12 from the aircraft engine is important since any oil spilled inside the cowling must be carefully cleaned, i.e. with a solvent. By providing a relatively lengthy helically threaded shaft 82, the top wall 84 of the oil filter 12 can be pierced, and the tip 86 of the threaded shaft 82 can be pushed down near the bottom of 88 of oil filter 12, where the oil pools. A lip 90 (a radially extending abutment surface) formed at the interface of the threaded front region 82 and a non-threaded rear region 92 is used as a surface which will tightly butt against the oil filter's top wall 84 when the shaft 82 is screwed into the oil filter 12. The oil is then evacuated from the oil filter 12 through a channel 94 in the shaft 82 which communicates with an opening 96 near its tip 86. The threaded shaft 82 can be rotatably driven into the oil filter with an electric drill (not shown) as with the first embodiment, with the threads on the shaft 82 and lip 90 seating on the oil filter 12, each contributing to the forming of a liquid tight seal with the oil filter. For automobile use, the shaft 82 need not be very long, and the sidewall of the oil filter can be drilled into.

A Femco-type oil valve 98 can be provided, and will be used with a valve coupler and vacuum hose (not shown), as described above with reference to the first embodiment. After the oil is withdrawn, the oil filter 12 can then be removed without spilling any oil on the motor and its housing.

Figure 6:
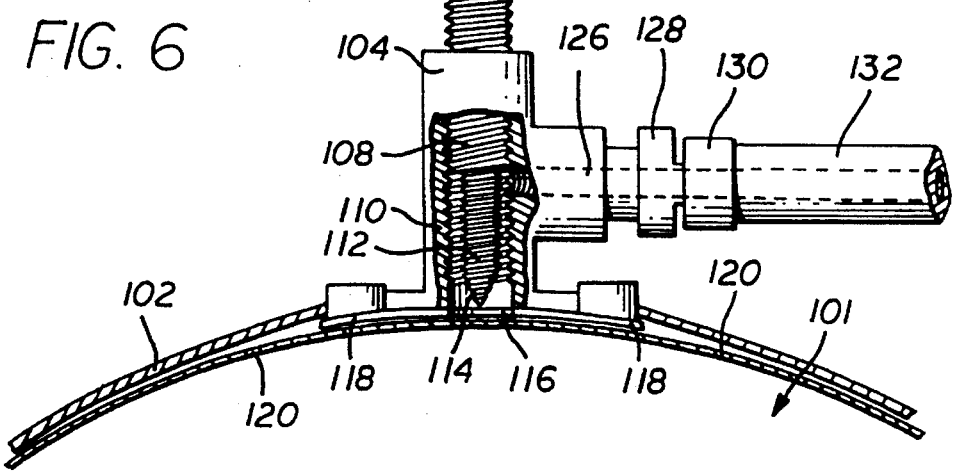
FIG. 6 is a partially exposed side view of a third embodiment of the device for drawing fluid from a container prior to its puncturing screw being driven into the wall of the container.
Figure 7:
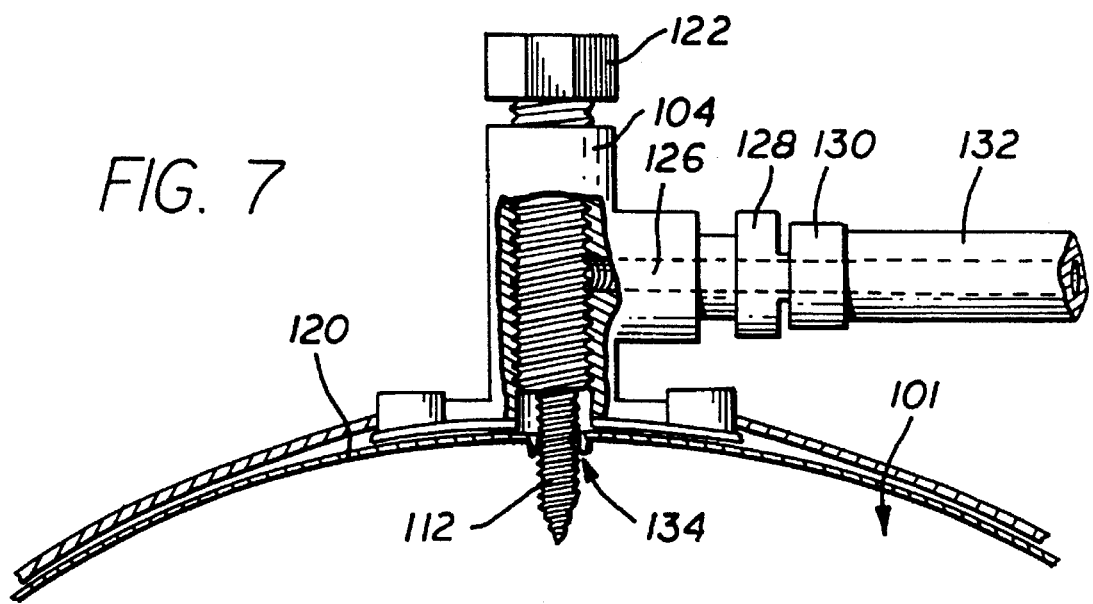
FIG. 7 is partially exposed side view of the embodiment of FIG. 6, with its puncturing screw driven into the wall of the container to form a opening in the wall.
Figure 8:
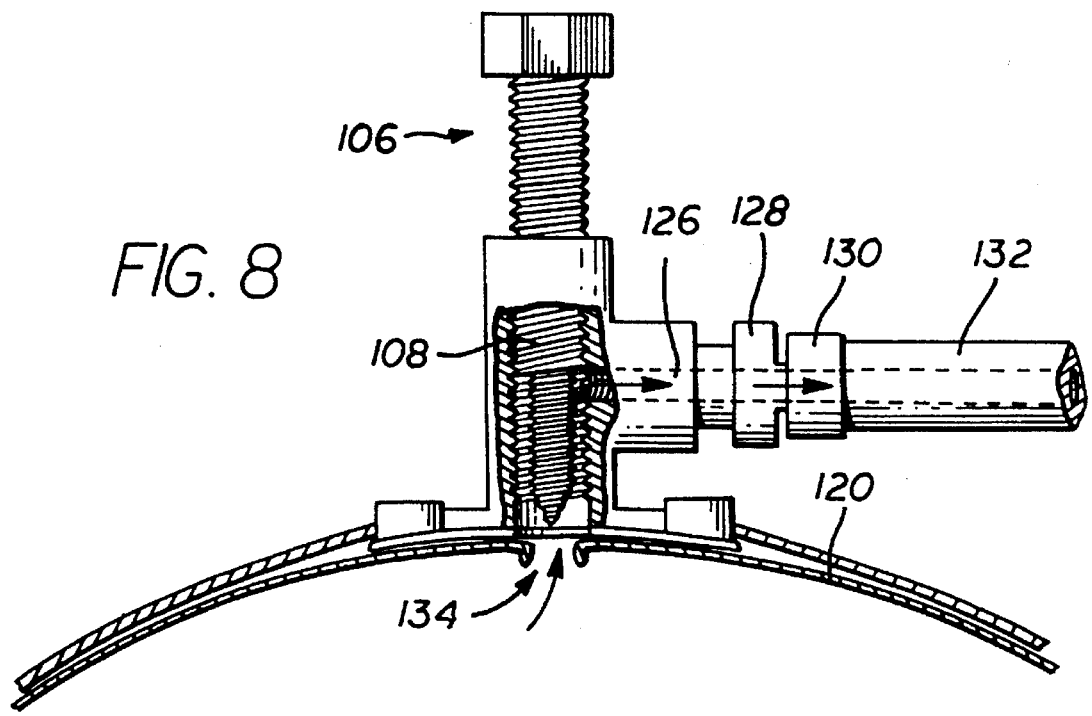
FIG. 8 is a partially exposed top view of the embodiment of FIG. 6, with the puncturing screw being backed out of the hole, so fluid may flow through the hole, out of the container and out through a valve.

Turning to FIGS. 6–8, a third embodiment of a fluid removing device 100 is shown attached to a container 101 (shown herein as an oil filter). As with the first embodiment 10, it has a clamp means 102 (straps), to which a screw guide body 104 attaches. The screw guide body 104 carries a threaded screw means 106, which has an upper male threaded portion 108, which screws into a female threaded opening 110 in the screw guide body 104. A drilling portion 112 is positioned on the front end of the screw means 106, and has a sharpened cutting point 114. The diameter of the drilling portion 112 is smaller than that of the male threaded portion 108.

The front end 116 of the screw guide body 104 is open to permit the drilling portion 112 to pass therethrough. The screw guide body 104 has a forward sealing surface 118. The clamp means 102 is attached to the screw guide body 104, and fluid tightly clamps the screw guide body 104 to the filter's wall 120. At the other end of the screw means 106, a screw turning engagement end. 122, such as a hex head, is provided. Turning the screw means 106, with for example, a socket wrench or drill will twist the screw means 106, bringing its drilling portion into cutting contact with the filters wall 120, so the screw means 106 will protrude through the filter's wall and into the filter wall 120, as is best shown in FIG. 7.

The screw guide body 104 has a side port 124, with a side port fluid channel 126 formed therein, which communicates with the female threaded channel 110 in the screw guide body 104. A fluid control valve 128 is positioned on the side port 124, which connects to a valve actuating coupler 130, and a vacuum hose 132. These preferably comprise the type of valve and coupler described above with reference to FIG. 2.

As shown in FIG. 7, when the screw means 106 is drilled into the wall 120 of the oil filter 101, it forms a hole 134. When the screw means 106 is backed out of the hole 134 further enough, the upper threaded portion 108 will no longer block the entrance to the side port channel 126, and fluid will freely flow out of the container 101 through the hole 134, the side port channel 126, the valve 128, the valve actuating coupler 130, and out the vacuum line 132, thereby draining the oil filter 101.

A fourth embodiment of the invention 150 is shown in FIGS. 9–11. An oil filter 152 is shown attached to an motor 154. The oil filter draining device 150 has a clamping ring 156 which clamps around the oil filter 152. The claiming ring 156 has a pivot bracket 158 fixed thereto, with a aperture 160 formed therein. A clasp 162 is located on the pivot bracket 158. Referring in particularly to FIG. 12, the device 150 includes a punch lever 164 which has a head 166 with an oil filter piercing lever 168 with a sharp tip 170. The oil filter piercing lever 2168 is a mounted adjacent a channel 172 formed in head 166. The channel 172 fluidly communicates with a handle portion 174 with a handle channel 176 formed therein. The punch lever 164 has a sealing ring 178 located around the open end 173 of the channel 172. The head 166 has a hook 180.

The punch lever 164 is hooked with its hook 180 onto the clasp 162 of the pivot bracket 158, and the punch lever 164 is pivotable thereon. FIG. 9 is a side view of the device 150, prior to its punch lever 164 being pivoted. FIG. 10 is a side view of device 150, with its punch lever 164 pushed into contact with the oil filter 152. The sharp tip 170 of the oil filter piercing lever 164 will puncture the wall 182 of the oil filter 152 and the sealing ring 178 will establish an oil tight seal with a face 184 of the pivot bracket 158. A retention means (not shown) is used to retain the punch lever 164 in this position. A vacuum line 186 is attached to the handle portion 174 of the punch lever 164, and is used to evacuate the oil from the oil filter 152. Ideally, a Femcotype oil valve 188, and valve actuating coupler 190, as shown and described in FIG. 2 and described above, are positioned intermediate the vacuum line 186 and the handle portion 174.

The above four described embodiments 10, 81, 100, and 150 provide easy, fast, and clean devices and methods to drain fluid from a fluid containing vessel, and in particular, an oil filter before it is removed.

The drawings and the foregoing description are not intended to represent the only form of the invention in regard to the details of its construction and manner of operation. In fact, it will be evident to one skilled in the art that modifications and variations may be made without departing from the spirit and scope of the invention. Changes in form and in the proportion of parts, as well as the substitution of equivalents, are contemplated as circumstances may suggest or render expedient; and although specific terms have been employed, they are intended in a generic and descriptive sense only and not for purpose of limitation, the scope of the invention being g delineated in the following claims:

I claim:

1. A fluid container draining device which allows fluid to be removed from a fluid container in a controlled manner, said fluid container having walls defining a fluid filled interior region therebetween, said fluid container draining device comprising:

a threaded screw means having a sharpened tip at its forward region, which screw means when turned will screw into and penetrate the wall of the fluid container and enter the fluid containing cavity of the fluid container, said screw means having an internal channel communicating between an opening at the forward end of the screw means and a rear region of the threaded screw means, said rear region being externally threaded;

a means to provide fluid tight sealing between the screw means and the fluid container wall to prevent fluid leakage from between the threaded screw means and the walls of the fluid container;

a turning surface adapted for engagement with a drill to permit said fluid container draining device to be turned to drill and screw said threaded screw means into the wall of the fluid container to sealably engage the fluid container draining device therewith, independent of other means to retain the device in contact with the fluid container; and a fluid valve means positioned at the rear region of the screw means in fluid connection with the channel, said fluid valve means providing fluid flow control between the interior of the fluid container and the outside of the fluid container.

2. The fluid container draining device of claim 1, wherein the means to provide fluid tight sealing between the screw means and the fluid container's walls to prevent fluid leakage comprises a radially extending abutment surface located rearward of the tip of the threaded screws means, wherein when said abutment surface is tightly abutted against the wall of the fluid container, a seal is formed therewith.

3. The fluid container draining device of claim 1, wherein said fluid valve means is provided with a fitting for connection to said suction line to thereby permit fluid to be evacuated from the fluid container.

4. The fluid container draining device of claim 1, wherein the fluid container draining device is adapted for use in draining fluid from fluid filters which are still positioned on machines and motors.

5. The fluid container draining device of claim 1, wherein the fluid container is an oil filter adapted to be positioned on a motor.

6. The fluid container draining device of claim 1, wherein the fluid value means comprises a valve which is only opened up when it is coupled with a drain line, and which otherwise remains closed.

7. A fluid filter draining device adapted to permit fluid to be removed from fluid filters mounted on one of a machine and motor in a controlled manner, said fluid filters mounted on machines and having walls defining a fluid filled interior region therebetween, said fluid filter draining device comprising:

a threaded screw means with a sharpened tip, which screw means when turned will penetrate the wall of the fluid filter and enter the fluid containing cavity of the fluid filter, said screw means having an internal channel communicating between an opening at a forward end of the screw means and a rear region of the threaded screw means;

a means to provide fluid tight sealing between the screw means and the fluid filter wall to prevent fluid leakage;

a turning surface adapted for engagement with a drill to permit said fluid container draining device to be turned to drill and screw said threaded screw means into the wall of the fluid container to sealably engage the fluid container draining device therewith, independent of other means to retain the device in contact with the fluid filter; and a fluid valve means positioned at the rear region of the screw means, in fluid connection with the channel, said valve means providing fluid flow control between the interior of the fluid filter and the outside of the fluid filter.

8. The fluid filter draining device of claim 7, wherein the fluid filter is an oil filter, and the fluid filter draining device is adapted to permit removal of fluid from an oil filter attached to machines and motors.

9. The fluid filter draining device of claim 7, wherein the means to provide fluid tight sealing between the screw means and the fluid filter's walls to prevent fluid leakage comprises a radially extending abutment surface located rearward of the tip of the threaded screw means, wherein when said abutment surface is tightly abutted against the wall of the fluid filter, a seal is formed therewith.

10. The fluid filter draining device of claim 7, wherein said fluid valve means is provided with a fitting for connection to a suction line to thereby permit fluid to be evacuated from the fluid filter.

11. The fluid filter draining device of claim 7, wherein the fluid valve means comprises a valve which is only opened up when it is coupled with a drain line, and which otherwise remains closed.

12. A fluid container draining device which allows fluid to be removed from a fluid container in a controlled manner, said fluid container having walls defining a fluid filled interior region therebetween, said fluid container draining device comprising:

a threaded screw means with a sharpened tip, which screw means when turned will penetrate the wall of the fluid container and enter the fluid containing cavity of the fluid container, said screw means having an internal channel communicating between an opening at a forward end of the screw means and a rear region of the threaded screw means;

a means to provide fluid tight sealing between the screw means and the fluid container wall to prevent fluid leakage;

a turning surface adapted for engagement with a drill to permit said fluid container draining device to be turned to drill and screw said threaded screw means into the wall of the fluid container to sealably engage the fluid container draining device therewith, independent of other means to retain the device in contact with the fluid container; and a fluid valve means positioned at the rear region of the screw means, in fluid connection with the channel, said valve means providing fluid flow control between the interior of the fluid container and the outside of the fluid container and which is only opened up when it is coupled with a drain line, and which otherwise remains closed.

* * * * *